March 4, 1969   H. W. WELSH   3,430,737
FRICTIONAL BRAKE SYSTEM

Filed April 27, 1966

INVENTOR
HARVEY W. WELSH

United States Patent Office 3,430,737
Patented Mar. 4, 1969

3,430,737
FRICTIONAL BRAKE SYSTEM
Harvey W. Welsh, 5631 Wilhelmina Ave.,
Woodland Hills, Calif. 91364
Filed Apr. 27, 1966, Ser. No. 546,162
U.S. Cl. 188—73                11 Claims
Int. Cl. F16d 55/224, 63/00, 65/00

ABSTRACT OF THE DISCLOSURE

The frictional brake system employs a lever arm with two brake pads attached thereto in such a way that they bear on opposite sides of the member to be braked. One of the brake pads takes the place of a pivot pin which would be required in a conventional lever system and, as a result, a significant multiplication in the braking force is achieved over that of a simple lever system or of direct acting brake pads with little or no self-energization.

---

Figure 1:
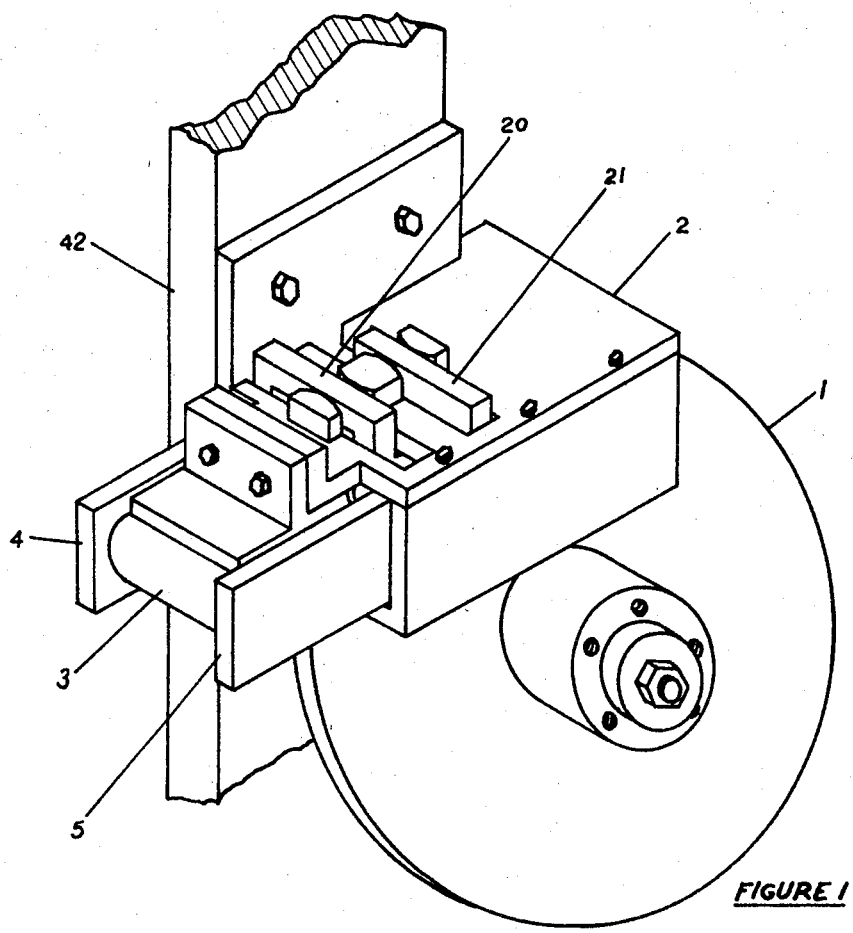

This invention relates to a frictional brake system in which the applied force is amplified significantly over that of conventional disc or drum brake systems by the employment of a simple but novel lever and brake pad system to force the stationary brake member against the moving member. The force multiplication factor is related to the geometry and to the brake friction coefficient, and can be expressed by a mathematical equation. If desired, the brake system can be designed for high force multiplication factors with essentially no self-energization or, if desired, the multiplication factor can be further increased by designing to include a self-energizing feature. Further, it can include a self-adjusting feature to maintain close proximity between the brake friction pads and the member to be braked during the period that braking effort is not desired. It can also include a simple mechanism to provide a secondary or emergency actuation system which uses the same force amplifier feature as the primary brake system.

The concept is applicable to disc brakes, drum brakes, cone brakes, and variations thereof; and to the braking systems involving linear motion, such as would be the case for a vehicle moving on a rail and for which it is desired to apply a braking force to the rail to retard the vehicle. For descriptive purposes, the following discussion will be generally directed to disc type brakes such as are used on automobiles; however, the application of the concept to drum, linear, etc., types of brakes will be apparent to those skilled in the art.

The disc brake has been used on aircraft for many years; recently it has found considerable favor for automotive applications. It has demonstrated many favorable characteristics over the more conventional drum-type automotive brakes in that it is better cooled, exhibits a lesser tendency to fade, and has more uniform braking characteristics. The typical automotive disc brake, as exemplified by Patent No. 3,150,745 granted to Eksergian and Patent No. 3,134,459 to Burnett and Powlas, employs friction brake pads which are forced against a disc, usually by the fluid pressure acting on a hydraulic piston which is directly attached to the friction brake pad. The applied force is limited to the product of the hydraulic pressure and the total hydraulic piston area. This type of direct acting disc brake does not have a self-energizing characteristic, as is the case for the conventional automotive drum-type brake, and requires some type of hydraulic pressure booster to obtain the increased force which is necessary to obtain the required retarding friction force for many applications. This need can be met by adapting a booster system to increase the hydraulic pressure to the brake cylinder over that which could be obtained by the usual pedal pressure. Another pressurizing concept is the referenced Rockwell Instantor Brake which uses the friction force of a set of drum brakes to amplify the hydraulic pressure applied to the second set.

Figure 5:
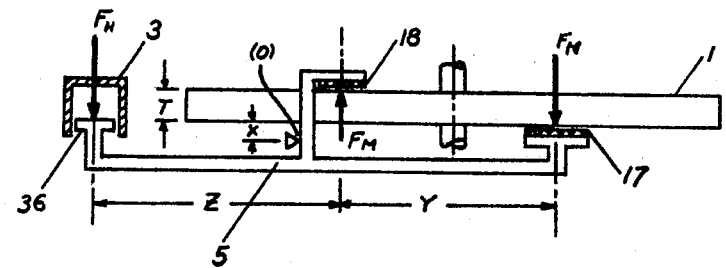
Figure 6:
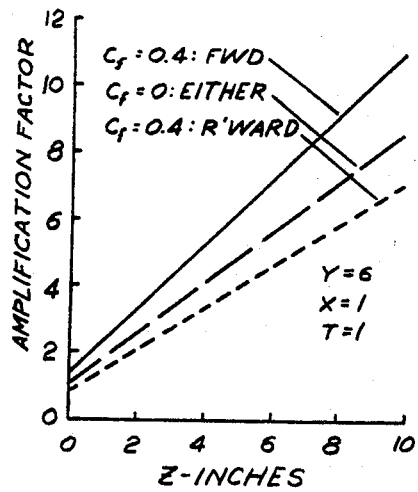
Figure 7:
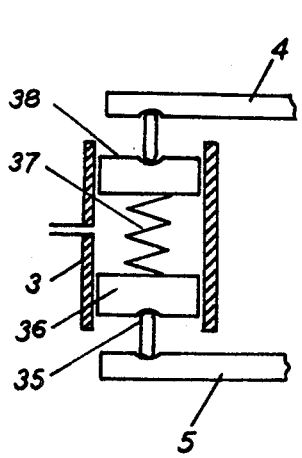
Figure 8:
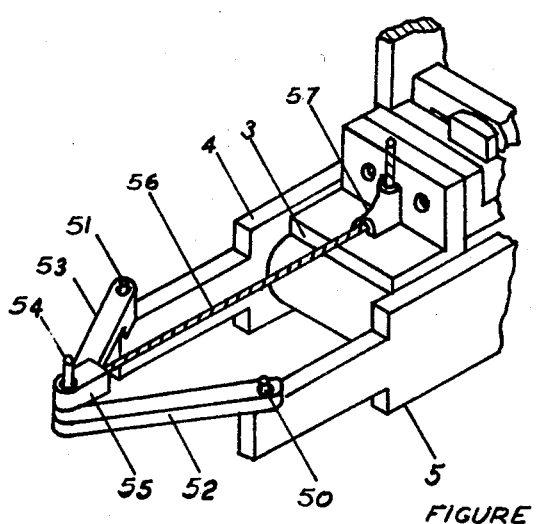

The Amplifier Brake invention described herein provides a simple means of significantly amplifying the ratio of force applied to the friction pad compared to the actuating force. Ratios of 6:1 or higher are readily attained, the exact ratio depending upon the geometry of the specific design and, to a lesser degree, upon the friction coefficient between the brake pads and the disc or other member being retarded. The physical concept of this invention is illustrated in FIGURES 1, 2, 3 and 4. The mechanics of its operation are illustrated in FIGURE 5; the representative amplification ratio is plotted in FIGURE 6 as a function of the brake geometry and friction coefficient. A method of automatically maintaining a minimum distance between the brake friction pads and the disc is shown in FIGURE 7; and FIGURE 8 shows a mechanical secondary actuator applied to the system, providing a parking or emergency braking function.

FIGURE 1 shows the assembly of the five major components. Disc 1 rotates on a wheel bearing as in conventional automotive practice; brake housing 2 is attached to the disc and wheel bearing support 42 and retains the hydraulic cylinder assembly 3 which is rigidly attached to the brake housing, and the two brake arm assemblies 4 and 5 which are loosely supported by the brake housing.

Figure 3:
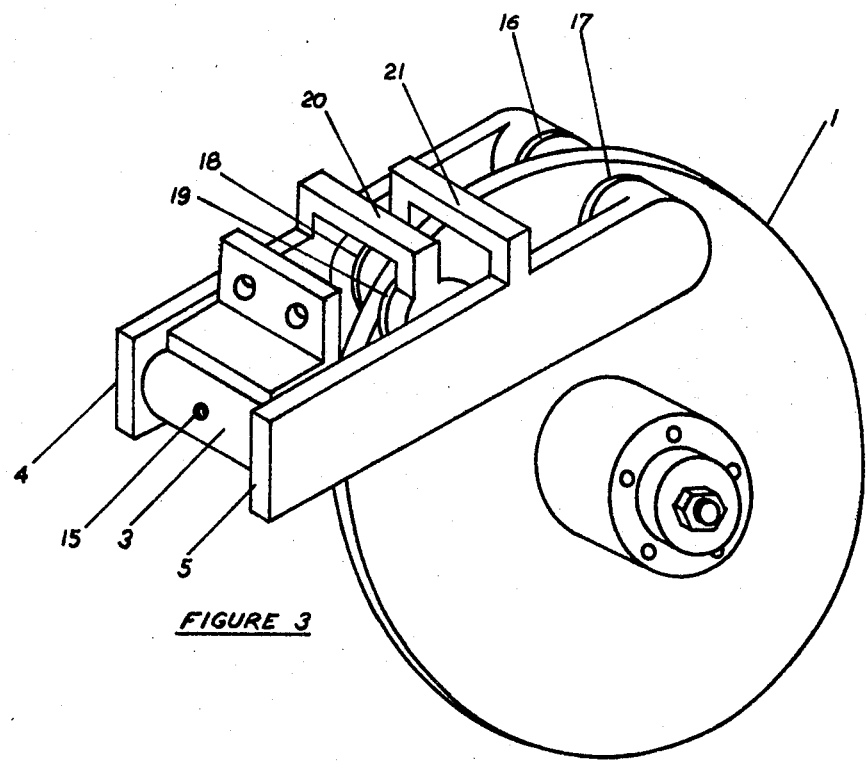
Figure 4:
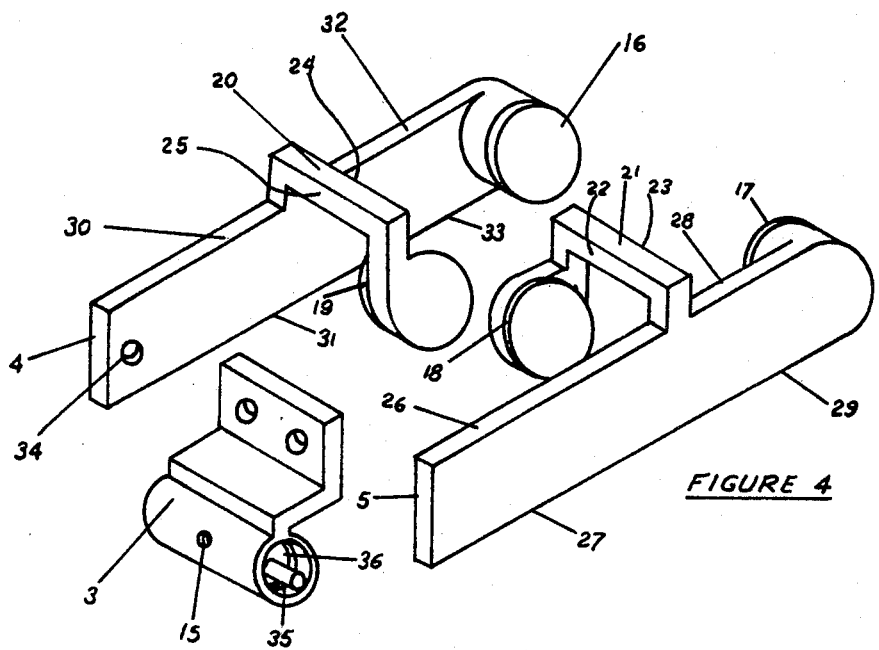

FIGURE 3 presents the functional relation of the brake arm assemblies 4 and 5, and the hydraulic cylinder assembly 3, with the brake housing 2 removed; and an exploded view of the brake arm assemblies and the hydraulic cylinder assembly is shown in FIGURE 4. Two pistons, 36 and its opposite member not shown, in hydraulic cylinder 3 move outward when acted upon by fluid pressure introduced through hole 15, transferring equal forces to the left and right brake arm assemblies 4 and 5, through piston rods 35 and its opposite member not shown. These applied forces cause the primary friction pads 16 and 17 and the secondary friction pads 18 and 19 to contact the disc 1, creating a friction drag force. The primary friction pads 16 and 17 are directly attached to the brake arms 4 and 5, respectively, while the secondary friction pads 18 and 19 are attached to cross-over members 20 and 21, respectively, each acting on opposing sides of the disc. In the case of brake arm assembly 4, the primary friction pad 16 acts on the same side of the disc as the brake arm, while the secondary friction pad 19 is attached to cross-over member 20 and presses against disc 1 on the opposite side; in the case of brake arm assembly 5, the primary friction pad 17 acts on the same side of the disc as the brake arm, while the secondary friction pad 18 is attached to cross-over member 21 and presses against the opposite side of the disc.

Figure 2:
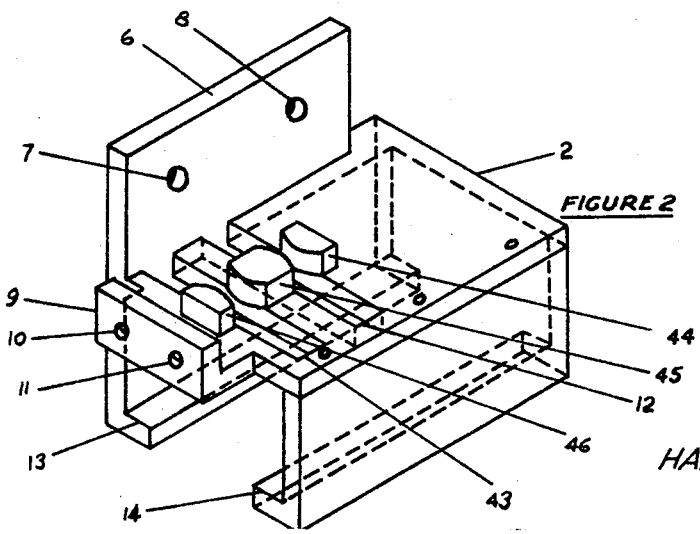

FIGURE 2 shows the brake housing removed from the other components. The brake housing assembly 2 can be made of one or more pieces, as required by assembly requirements. The brake housing back plate 6 is attached to the wheel bearing support 42 by passing bolts through holes 7 and 8. The hydraulic cylinder support flange 9 has holes 10 and 11 for bolting the hydraulic cylinder assembly to the brake housing assembly. The rectangular slots 12 and 43 in the top surface of the brake housing provide space for the brake arm assembly crossover members. Pivot blocks 44, 45, and 46 are integral elements of the top surface of the brake housing and loosely contact the vertical surfaces of the brake arm cross-over members 20 and 21 and serve the dual purpose of resisting the force on the brake arm assemblies which results from the friction between the brake friction surfaces and the disc, and act as pivot points on the cross-over members 20 and 21 of brake arm assemblies 5 and 4, respectively. The lower surfaces 27, 29, 31, and 33 of the brake arm assemblies 4 and 5 are loosely positioned on the lower ledges 13 and 14 of the brake housing assembly; the upper surfaces of the brake arm assemblies 26, 28, 30, and 32 are loosely positioned by the undersurface of the top of the brake housing assembly. These mating surfaces restrain the torque in the vertical plane which is introduced into brake arm assemblies 4 and 5 by the action of the friction pads on the disc.

For brake arm assembly 5, the cross-over member 21 loosely fits into and rises above the rectangular slot 12 in the top of the brake housing 2. Cross-over member 21 is loosely located in the tangential direction between the pivot blocks 44 and 45 of housing 2. The cross-over member 21 aft surface 22 bears against the pivot block 45 when braking a counter-clockwise rotating disc; and cross-over member 21 forward surface 23 bears against pivot block 44 when braking a clockwise rotating disc. For brake arm assembly 4, the cross-over member 20 loosely fits into and rises above the rectangular slot 43 in the top of brake housing 2. This cross-over member is loosely located in the tangential direction between pivot blocks 45 and 46. The cross-over member 20 aft surface 25 bears against pivot block 46 when braking a counter-clockwise rotating disc; and the forward surface 24 bears against pivot block 45 when braking a clockwise rotating disc.

The pocket 34 in brake arm assembly 4 and a corresponding pocket in the brake arm assembly 5, not shown, loosely retain the ends of the two opposing hydraulic piston rods, of which only piston rod 35 is shown. Two opposing pistons 36, and the mating one which is not shown, transmit the hydraulic force through piston rods 35 and the opposite one not shown, to pocket 34 in brake arm assembly 4 and to a corresponding pocket not shown in brake arm assembly 5.

FIGURE 5 illustrates the mechanics of the operation of the brake and, for simplicity, only one brake arm assembly is shown with the disc 1 and the hydraulic cylinder assembly 3. A single acting hydraulic cylinder is shown in this illustration, as would be the case in a single arm application. The hydraulic pressure introduced into cylinder 3 produces a hydraulic force $F_H$ on piston 36. This force acts on brake arm assembly 5, forcing friction pads 17 and 18 against the disc 1. The sum of the normal forces on pads 17 and 18 exceed the actuating force $F_H$ of the hydraulic piston 36. The ratio of the total normal force on the two friction pads to the actuating hydraulic force is termed the Amplification Ratio, A. The Amplification Ratio can be expressed in terms of the geometry of the brake system and the friction coefficient of the friction pads. The amplification ratio for rotation in the forward direction for the hydraulic cylinder is derived by using the following nomenclature and that in FIGURE 5.

where $A_f$ = forward direction Amplification Ratio for both brake arm assemblies, based on the hydraulic cylinder cross-section area and fluid pressure
$Z$ = distance between centers of the piston rod pocket and the friction pad 18
$Y$ = distance between centers of friction pads 17 and 18
$X$ = distance between the pivot point (0) and near face of disc 1
$T$ = thickness of disc 1
$C_f$ = friction coefficient of pads 17 and 18 on the disc, assumed to be equal for both The total friction force is $$F = C_f(F_M + F_N) \qquad (1)$$

The friction force of a direct acting brake system is $$F' = C_f F_H \qquad (2)$$

The amplification factor is $$A = \frac{F}{F'} \qquad (3)$$

$$= \frac{F_M + F_N}{F_H} \qquad (3a)$$

Considering the free body forces in the vertical direction, $$F_H = F_M - F_N \qquad (4)$$

Substituting (4) into (3)

$$A = \frac{F_M + F_N}{F_M - F_N} \qquad (5)$$

$$= \frac{F_M/F_N + 1}{F_M/F_N - 1} \qquad (5a)$$

For rotation in the forward direction, the amplification factor $A_F$ is obtained by solving for moments about the pivot point, $$F_H(Z-K) + F_M \cdot K + F_M \cdot C_f(X+T) \\ - F_N(Y+K) + F_N \cdot C_f \cdot X = 0 \qquad (6)$$

where $K$ is the distance along the arm from the pivot point to the center of pad 18;

Substituting Equation 4 for $F_H$ $$(F_M - F_N)(Z-K) + F_M \cdot K + F_M \cdot C_f(X+T) \\ - F_N(Y+K) + F_N \cdot C_f \cdot X = 0 \qquad (6a)$$

$$F_M(Z-K) + F_M \cdot K + F_M \cdot C_f(X+T) \\ - F_N(Z-K) - F_N(Y+K) + F_N \cdot C_f \cdot X = 0 \qquad (6b)$$

$$F_M[Z + C_f(X+T)] + F_N[C_f X - (Z+Y)] = 0 \qquad (6c)$$

$$\frac{F_M}{F_N} = \frac{Z+Y-C_f X}{Z+C_f(X+T)} \qquad (6d)$$

The amplification ratio, A, can be readily found by substituting Equation 6d into Equation 5a. For rotation in the forward direction:

$$A_F = \frac{\frac{Z+Y-C_f X}{Z+C_f(X+T)} + 1}{\frac{Z+Y-C_f X}{Z+C_f(X+T)} - 1} \qquad (7)$$

or $$A_F = \frac{Z+Y-C_f X + Z + C_f X + C_f T}{Z+Y-C_f X - Z - C_f X - C_f T} \qquad (7a)$$

and $$A_F = \frac{2Z+Y+C_f T}{Y-C_f(2X+T)} \qquad (7b)$$

When disc rotates in reverse (away from the hydraulic cylinder), the amplification factor $A_R$ is obtained as follows:

$$F_H(Z-K) - F_N(Y+K) - F_N \cdot C_f \cdot X \\ + F_M K - F_M \cdot C_f(X+T) = 0 \qquad (8)$$

$$(F_M - F_N)(Z-K) - F_N(Y+K) - F_N \cdot C_f \cdot X \\ + F_M \cdot K - F_M \cdot C_f(X+T) = 0 \qquad (8b)$$

$$F_M[Z - C_f(T+X)] - F_N[+Z + C_f X + Y] = 0 \qquad (8c)$$

$$\frac{F_M}{F_N} = \frac{+Z + C_f X + Y}{Z - C_f(T+X)} \qquad (8d)$$

Substituting into Equation 5a, the reverse amplification ratio $A_R$ is:

$$A_R = \frac{Z + C_f X + Y + Z - C_f(T+X)}{Z + C_f X + Y - Z + C_f(T+X)} \qquad (9)$$

$$A_R = \frac{2Z + Y - C_f T}{Y + C_f(2X+T)} \qquad (9b)$$

Should the friction coefficient of the primary and secondary friction pads be different, the proper equations can be developed readily.

The forward and reverse Amplification Ratios are shown in FIGURE 5 for a range of hydraulic arm lengths, Z, and for a friction coefficient of zero and 0.4 for fixed values of Y, T, and X. As will be noted, Amplification Ratios of 4 to 10 or higher are readily attained. It will be noted that the friction coefficient influences the Amplification Ratio, being higher in the forward or anti-clockwise direction. If the contribution of the self-energizing characteristic is neglected by setting the friction coefficient equal to zero in Equations 1 and 2, the Amplification Ratio is the same for forward and reverse rotation, and is about midway between that previously discussed for forward and reverse rotation with a friction coefficient of 0.4.

Thus, with a simple system, it is possible to attain very high braking forces with the application of a relatively low actuating force.

A friction pad wear compensating feature is readily adapted to the Amplifier Brake when energized by hydraulic fluid. This is achieved by permitting a small residual hydraulic pressure to remain in the cylinder 3 by means of a pressure-bias valve in the hydraulic system or, as shown in FIGURE 7, by inserting a suitable spring 37 between the hydraulic pistons 36 and 38 for the case of double acting cylinder, or between the piston and the cylinder head of a single acting piston.

One shortcoming of the conventional disc brake is that it is not well-suited to secondary actuation, as would be desired for the parking or emergency brake system of an automobile, for example. A secondary mechanical or hydraulic actuator can be readily adapted to the Amplifier Brake. FIGURE 8 illustrates a mechanical secondary actuation system which uses a hydraulic primary actuator. Links 52 and 53 are loosely connected to brake arm assemblies 5 and 4, respectively, by pins 50 and 51, respectively. The other end of these two links are loosely connected together and to a clevis 55 by pin 54. A tensile force on cable 56 pulls the clevis toward the brake housing and forces the two brake arm assemblies 4 and 5 apart, thus applying the actuating force which is then amplified in the manner indicated previously.

As will be apparent to those skilled in the art of design, the basic concept described above can be readily adapted to design variations. For example, the primary actuator force need not be hydraulic, but can be a force generated by any source; the friction pads may be loosely connected to the brake arm assemblies; a rotating drum can be substituted for the disc with the brake arm assemblies arranged so that alternate friction pads act on the inner and outer surfaces of the drum, rather than opposite sides of a disc; the brake assembly can be used on a device moving along a track, with the brake arms acting on the track in the same manner as they operate on the disc, etc. The principle is the same in all cases.

I claim:

1. A brake system for braking a rotatable member comprising:
   brake arm means having no fixed pivot about which movement of said brake arm means is limited;
   primary braking means attached to said arm means and located on one side of said braked member;
   secondary braking means attached to said arm means in spaced relation to said primary braking means along said brake arm means and located on the other side of said braked member; and
   an actuator connected with said brake arm means at a location such that said secondary means is between said actuator location and said primary braking means;
   said actuator bodily moving said brake arm means to directly force said secondary braking means against said braked member and to force said primary braking means against said braked member solely by the movement produced about said secondary braking means so that said primary and secondary braking means produce the entire reaction to said actuator and the force of said braking means on said braked member is amplified to exceed the actuation force.

2. A brake system as defined in claim 1 having housing means for supporting said brake arm means by engaging surfaces of said brake arm means and restraining said brake arm means against movement, other than in the direction produced by said actuator, by the reaction force produced by said braked member on said braking means.

3. A brake system as defined in claim 1 wherein said actuator connecting location is adjacent one end of said brake arm means and said primary braking means is adjacent the other end of said brake arm means and said braked member comprises a flat plate, said actuator producing a force acting in a direction substantially perpendicular to the plane of said braked member.

4. A brake system as defined in claim 1 wherein said primary and secondary braking means each comprise friction pad means.

5. A brake system as defined in claim 1 wherein said brake arm means comprises a cross-over member for supporting one of said braking means on the opposite side of said braked member from the other braking means.

6. A brake system as defined in claim 5 wherein said brake are means comprises:
   a brake arm located on one side of said braked member;
   said primary braking means being connected to said arm and said actuator acting on said arm in a direction away from said braked member;
   said cross-over member being attached to said arm and supporting said secondary braking means on the other side of said braked member.

7. A brake system as defined in claim 1 having:
   second brake arm means;
   second, primary brake means attached to said second arm means on the opposite side of said braked member from said first, primary braking means; and
   second, secondary braking means attached to said second arm means on the opposite side of said braked member from said first, secondary braking means;
   said actuator acting on said first and second arm means in opposite directions.

8. A brake system as defined in claim 7 wherein said said first and second primary and secondary braking means each comprise friction pad means.

9. A brake system as defined in claim 7 having housing means for supporting said first and second brake arm means by engaging surfaces thereof and restraining both said arm means against movement, other than in the direction produced by said actuator, by the reaction force produced by said braked member on both said braking means.

10. A brake system as defined in claim 9 wherein said first and second brake arm means each comprise a brake arm and a cross-over member, said brake arms being located on opposite sides of said braked member and being connected to said actuator.

11. A brake system as defined in claim 10 having linkage means attached to said arms for forcing said arms apart in the same direction as said actuator and providing a secondary braking force.

References Cited

UNITED STATES PATENTS

| 437,834 | 10/1890 | Kaseberg | 188—73 |
| 2,201,293 | 5/1940 | Hoppenstand | 188—76 |
| 2,285,241 | 6/1942 | Walther et al. | 188—76 |
| 2,307,663 | 1/1943 | Bernhardt | 188—73 X |

FOREIGN PATENTS 1,203,061   10/1965   Germany.

GEORGE E. A. HALVOSA, *Primary Examiner.*

U.S. Cl. X.R.

188—76